(12) United States Patent
Leppänen et al.

(10) Patent No.: US 11,937,071 B2
(45) Date of Patent: Mar. 19, 2024

(54) AUGMENTED REALITY SYSTEM

(71) Applicant: Nokia Technologies Oy, Espoo (FI)

(72) Inventors: Jussi Leppänen, Tampere (FI); Miikka Vilermo, Siuro (FI); Arto Lehtiniemi, Lempäälä (FI); Francesco Cricrì, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/088,432

(22) Filed: Nov. 3, 2020

(65) Prior Publication Data

US 2021/0160646 A1    May 27, 2021

(30) Foreign Application Priority Data

Nov. 27, 2019  (GB) ..................................... 1917244

(51) Int. Cl.
*H04S 7/00*     (2006.01)
*G06T 7/62*     (2017.01)
*G06T 11/00*    (2006.01)
*G10K 11/178*   (2006.01)

(52) U.S. Cl.
CPC ............... *H04S 7/304* (2013.01); *G06T 7/62* (2017.01); *G06T 11/00* (2013.01); *G10K 11/17873* (2018.01); *G10K 11/17885* (2018.01); *G10K 2210/1081* (2013.01); *H04S 2400/11* (2013.01)

(58) Field of Classification Search
CPC ... G10K 2210/1081; G06T 7/62; G06T 11/00; H04S 7/304
See application file for complete search history.

(56) References Cited

U.S. PATENT DOCUMENTS

| | | |
|---|---|---|
| 2013/0094682 A1 | 4/2013 | Lee et al. |
| 2015/0296289 A1* | 10/2015 | Lakkundi ............... H04R 3/005 381/92 |
| 2017/0188173 A1 | 6/2017 | Ranieri et al. |
| 2017/0230760 A1 | 8/2017 | Sanger et al. |
| 2019/0121522 A1* | 4/2019 | Davis ................... H04N 9/3185 |
| 2019/0306651 A1 | 10/2019 | Vilermo et al. |

FOREIGN PATENT DOCUMENTS

| | | |
|---|---|---|
| WO | 2019/002664 A1 | 1/2019 |
| WO | 2020/072953 A1 | 4/2020 |

OTHER PUBLICATIONS

"Amazing MIT Research Project Lets You Reach Into Augmented Reality", Upload, Retrieved on Oct. 20, 2020, Webpage available at : https://uploadvr.com/idv-augmented-reality/.
Search Report received for corresponding United Kingdom Patent Application No. 1917244.4, dated May 27, 2020, 4 pages.

* cited by examiner

*Primary Examiner* — Ping Lee
(74) *Attorney, Agent, or Firm* — ALSTON & BIRD LLP (57) ABSTRACT

A method, apparatus and computer program is described comprising: generating or obtaining at least one augmented reality image for presentation to a user, the augmented reality images comprising one or more virtual objects, displays or devices of an augmented reality system; attenuating real-world audio of the augmented reality system; and controlling the provision of audio to the user in at least one audio focus or beamform direction relating to at least one selected real-world object of the augmented reality system.

13 Claims, 9 Drawing Sheets

AUGMENTED REALITY SYSTEM

FIELD

The present specification relates to an augmented reality system. In particular, the specification relates to rendering audio in augmented reality systems.

BACKGROUND

Rendering virtual and real-world audio in augmented reality systems presents a number of challenges. There remains a need for further improvements in this field.

SUMMARY

In a first aspect, this specification provides an apparatus comprising means for performing: generating or obtaining at least one augmented reality image for presentation to a user (e.g. using augmented reality glasses or some similar device), the augmented reality images comprising at least one virtual object, display or device of an augmented reality system; attenuation of real-world audio (e.g. using active noise control) of the augmented reality system; and controlling the provision of audio to the user in at least one audio focus direction relating to at least one selected real-world object of the augmented reality system. The audio focus direction(s) may be beamform direction(s); other mechanisms for audio focussing are also possible.

In some example embodiments, the means are further configured to perform: generating or obtaining virtual audio of the augmented reality system for presentation to the user (e.g. using headphones, such as active noise control (ANC) headphones), wherein said virtual audio is associated with at least one of said at least one virtual object, display or device.

The means for controlling the provision of audio to the user may be further configured to perform: providing real-world audio to the user based on real-world audio in the at least one audio focus direction. The real-world audio may be provided by overriding the attenuation of real-world audio in the relevant audio focus direction(s).

In some example embodiments, providing real-world audio to the user based on the real-world audio in the at least one audio focus direction comprises means for performing: controlling overriding of the attenuation of said real-world audio (e.g. by providing suitable control signals to active noise control (ANC) headphones) in the at least one audio focus direction. In this way, an immersive effect may be improved.

The audio focus directions described above may be such that providing real-world audio to the user based on real-world audio in the at least one focus direction (e.g. by overriding of the attenuation of said real-world audio) is implemented for the at least one selected real-world object (e.g. for the entirety of the group) and/or in the directions of the at least one selected real-world object (e.g. only in those directions).

In some example embodiments, the means may be further configured to perform: using an imaging system to determine dimensions of at least one of the at least one selected real-world object; and controlling the providing of the real-world audio to the user (e.g. by overriding of the attenuation of said real-world audio) depending on the determined dimensions. Alternatively, or in addition, the means may be further configured to perform: receiving a user input to indicate dimensions of at least one of the at least one selected real-world object; and controlling the providing of the real-world audio to the user (e.g. by overriding of the attenuation of said real-world audio) depending on the indicated dimensions.

In some example embodiments, the means may be further configured to perform: identifying at least one first real-world object with which at least one of said at least one virtual object, display or device interact, wherein said at least one selected real-world object include said at least one first real-world object.

In some example embodiments, the means may be further configured to perform: identifying at least one second real-world object that is contextually relevant to at least one of said at least one virtual object, display or device, wherein said at least one selected real-world object include said at least one second real-world object.

In some example embodiments the means may be further configured to perform: identifying at least one virtual object, display or device of the augmented reality system with which the user interacts; and identifying at least one third real-world object, wherein said at least one third real-world object is associated with at least one of the at least one identified virtual object with which the user interacts, wherein said at least one selected real-world object include said at least one third real-world object.

The means for controlling the provision of audio to the user in the at least one audio focus direction may be configured to override the attenuation of said real-world audio. Alternatively, or in addition, the means for controlling the provision of audio to the user in the at least one audio focus direction is configured to obtain audio data from another source. Alternatively, or in addition, the means for controlling the provision of audio to the user in the at least one audio focus direction is configured to obtain synthesized audio.

The said means may comprise: at least one processor; and at least one memory including computer program code, the at least one memory and the computer program configured, with the at least one processor, to cause the performance of the apparatus.

In a second aspect, this specification provide a method comprising: generating or obtaining at least one augmented reality image for presentation to a user (e.g. using augmented reality glasses or some similar device), the augmented reality images comprising at least one virtual object, display or device of an augmented reality system; attenuating real-world audio of the augmented reality system (e.g. using active noise control); and controlling the provision of audio to the user in at least one audio focus direction relating to at least one selected real-world object of the augmented reality system. The audio focus direction(s) may be beamform direction(s).

The method may comprise: generating or obtaining virtual audio of the augmented reality system for presentation to the user (e.g. using headphones, such as active noise control (ANC) headphones), wherein said virtual audio is associated with at least one of said at least one virtual object, display or device.

Controlling the provision of audio to the user may comprise: providing real-world audio to the user based on real-world audio in the at least one audio focus direction. The real-world audio may be provided by overriding the attenuation of real-world audio in the relevant audio focus direction(s).

In some example embodiments, providing real-world audio to the user based on the real-world audio in the at least one audio focus direction comprises: controlling overriding of the attenuation of said real-world audio (e.g. by providing suitable control signals to active noise control (ANC) headphones) in the at least one audio focus direction. In this way, an immersive effect may be improved.

The audio focus directions described above may be such that providing real-world audio to the user based on real-world audio in the at least one focus direction (e.g. by overriding of the attenuation of said real-world audio) is implemented for the at least one selected real-world object (e.g. for the entirety of the group) and/or in the directions of the at least one selected real-world object (e.g. only in those directions).

The method may comprise: using an imaging system to determine dimensions of at least one of the at least one selected real-world object; and controlling the providing of the real-world audio to the user (e.g. by overriding of the attenuation of said real-world audio) depending on the determined dimensions. Alternatively, or in addition, the method may comprise: receiving a user input to indicate dimensions of at least one of the at least one selected real-world object; and controlling the providing of the real-world audio to the user (e.g. by overriding of the attenuation of said real-world audio) depending on the indicated dimensions.

The method may comprise: identifying at least one first real-world object with which at least one of said at least one virtual object, display or device interact, wherein said at least one selected real-world object include said at least one first real-world object.

The method may comprise: identifying at least one second real-world object that is contextually relevant to at least one of said at least one virtual object, display or device, wherein said at least one selected real-world object include said at least one second real-world object.

The method may comprise: identifying at least one virtual object, display or device of the augmented reality system with which the user interacts; and identifying at least one third real-world object, wherein said at least one third real-world object is associated with at least one of the at least one identified virtual object with which the user interacts, wherein said at least one selected real-world object include said at least one third real-world object.

Controlling the provision of audio to the user in the at least one audio focus direction may be configured to override the attenuation of said real-world audio. Alternatively, or in addition, controlling the provision of audio to the user in the at least one audio focus direction is configured to obtain audio data from another source. Alternatively, or in addition, controlling the provision of audio to the user in the at least one audio focus direction is configured to obtain synthesized audio.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: generating or obtaining at least one augmented reality image for presentation to a user (e.g. using augmented reality glasses or some similar device), the augmented reality images comprising at least one virtual object, display or device of an augmented reality system; attenuating real-world audio of the augmented reality system (e.g. using active noise control); and controlling the provision of audio to the user in at least one audio focus direction relating to at least one selected real-world object of the augmented reality system.

In a sixth aspect, this specification describes a computer-readable medium (such as a non-transitory computer-readable medium) comprising program instructions stored thereon for performing at least the following: generating or obtaining at least one augmented reality image for presentation to a user (e.g. using augmented reality glasses or some similar device), the augmented reality images comprising at least one virtual object, display or device of an augmented reality system; attenuating real-world audio of the augmented reality system (e.g. using active noise control); and controlling the provision of audio to the user in at least one audio focus direction relating to at least one selected real-world object of the augmented reality system.

In a seventh aspect, this specification describes an apparatus comprising: at least one processor; and at least one memory including computer program code which, when executed by the at least one processor, causes the apparatus to: generate or obtain at least one augmented reality image for presentation to a user (e.g. using augmented reality glasses or some similar device), the augmented reality images comprising at least one virtual object, display or device of an augmented reality system; attenuate real-world audio of the augmented reality system (e.g. using active noise control); and control the provision of audio to the user in at least one audio focus direction relating to at least one selected real-world object of the augmented reality system.

In an eighth aspect, this specification describes an apparatus comprising: an augmented reality output module (or some other means) for generating or obtaining at least one augmented reality image for presentation to a user (e.g. using augmented reality glasses or some similar device), the augmented reality images comprising at least one virtual object, display or device of an augmented reality system; an attenuation module, such as an active noise cancellation module (or some other means) for attenuation of real-world audio (e.g. using active noise control) of the augmented reality system; and an audio output module (or some other means) for controlling the provision of audio to the user in at least one audio focus direction relating to at least one selected real-world object of the augmented reality system. The audio focus direction(s) may be beamform direction(s). An audio input module (or some other means) may be provided for generating or obtaining virtual audio of the augmented reality system for presentation to the user (e.g. using headphones, such as active noise control (ANC) headphones), wherein said virtual audio is associated with at least one of said at least one virtual object, display or device.

BRIEF DESCRIPTION OF THE DRAWINGS

Example embodiments will now be described, by way of example only, with reference to the following schematic drawings, in which.

DETAILED DESCRIPTION

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Figure 1:
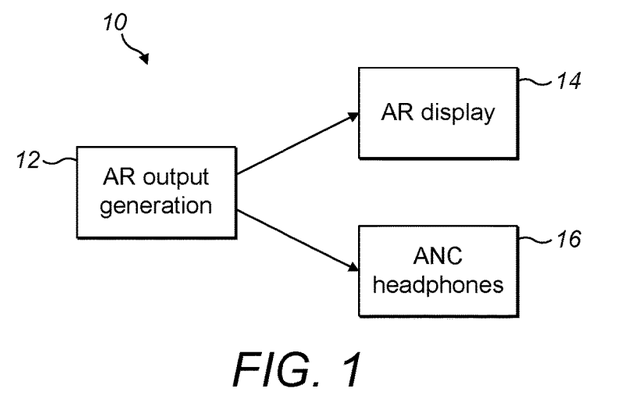
FIG. 1 is a block diagram of a system in accordance with an example embodiment.

FIG. 1 is a block diagram of a system, indicated generally by the reference numeral 10, in accordance with an example embodiment. The system 10 comprises an augmented reality (AR) output generation module 12, an augmented reality display 14 and active noise control (ANC) headphones 16.

Figure 2:
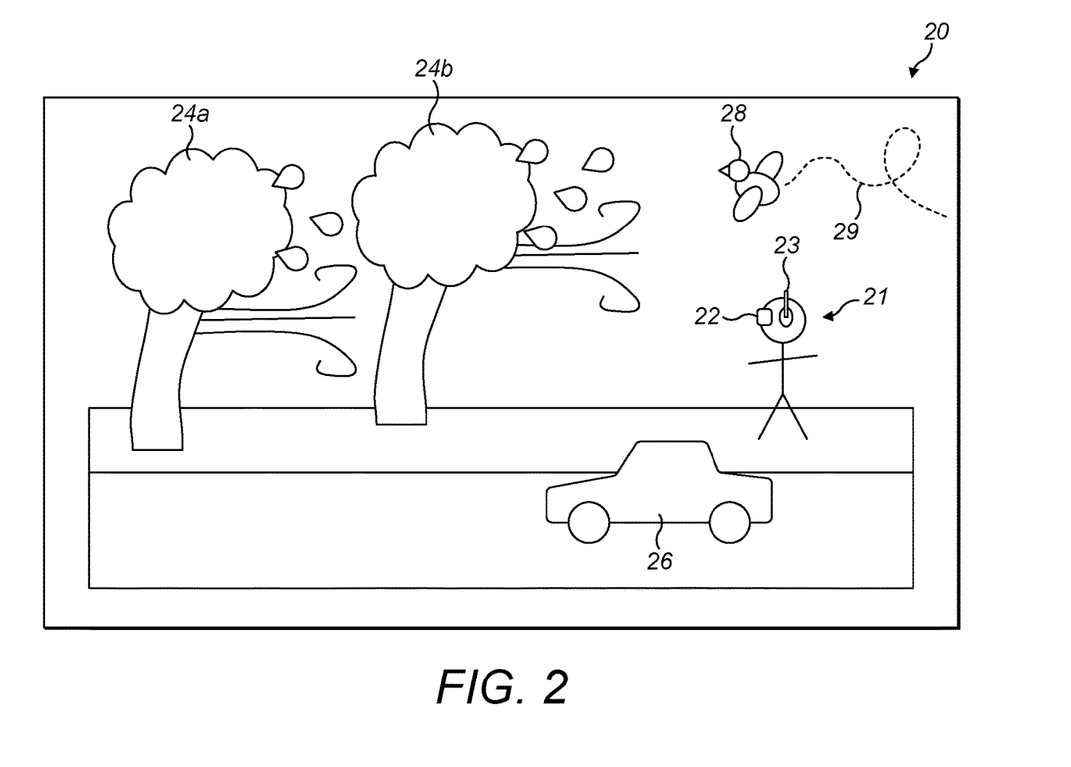
FIGS. 2 to 4 are block diagrams showing example scenarios in which example embodiments may be used.

FIG. 2 is a block diagram showing an example scenario, indicated generally by the reference numeral 20, in which example embodiments may be used.

In the scenario 20, a user 21 is wearing augmented reality (AR) glasses 22 (such as the augmented reality (AR) display 14 described above) and ANC equipped headphones 23 (such as the headphones 16 described above). The user 21 is walking along a street, which includes a first tree 24a, a second tree 24b and a car 26.

In the scenario 20, the AR glasses 22 are used to present augmented reality images to the user 21 (e.g. as provided by the AR output generation module 12). The augmented reality images include a virtual object in the form of a virtual bird 28. The virtual bird 28 moves along a path 29. Suitable images of the virtual bird 28 may, for example, be generated by the AR output generation module 12 described above.

The headphones 23 can be used to attenuate real-world audio of the scenario 20 (using active noise control). Thus, when the ANC functionality of the headphones 23 is activated, real-world audio, such as noise from the trees 24a, 24b and the car 26, can be attenuated.

Figure 3:
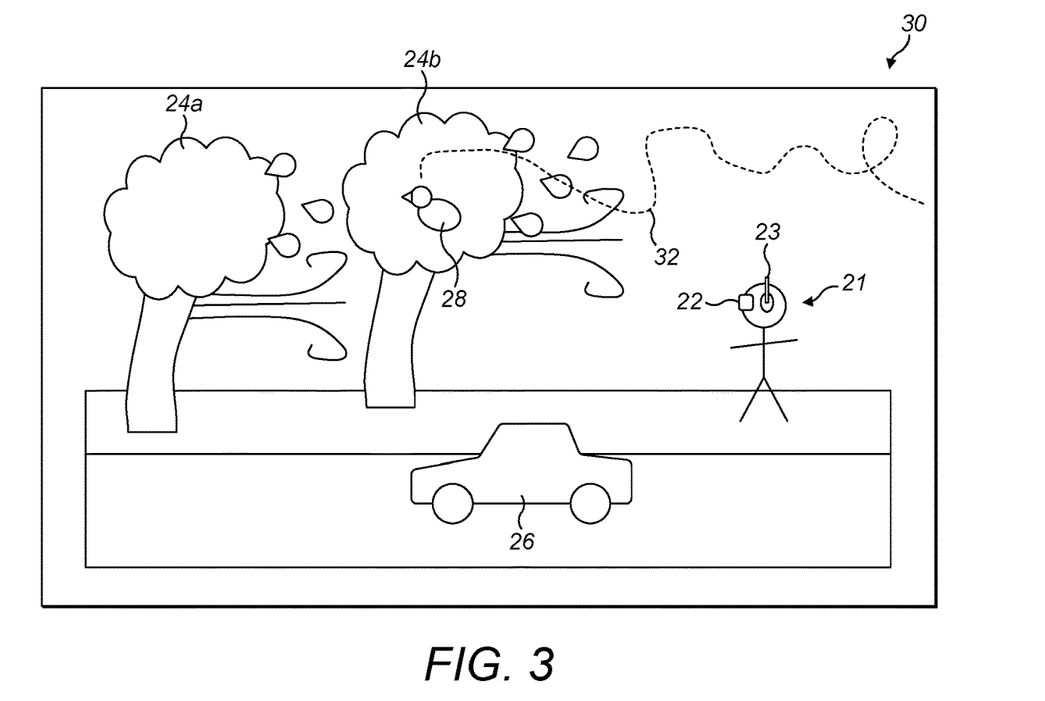

FIG. 3 is a block diagram showing an example scenario, indicated generally by the reference numeral 30, in which example embodiments may be used. The scenario 30 includes the user 21, who is wearing the AR glasses 22 and the headphones 23 described above. The user 21 is walking along a street, which includes the first tree 24a, the second tree 24b and the car 26. The virtual bird 28 (as presented to the user 21 using the AR glasses 22) moves along a path 32. As noted above, suitable images of the virtual bird 28 may be generated by the AR output generation module 12.

In some example embodiments, the virtual bird 28 is able to interact with real-world objects. For example, in the example scenario 30, the virtual bird 28 has landed on the second (real-world) tree 24b. If the headphones 23 are being used to attenuate real-world audio of the scenario 30 (as described above), then the user sees the virtual bird 28 in the second tree 24b, and sees that tree bending in the wind and leaves moving, but does not hear the sounds that the wind and the tree is making. This lessens the immersion of the augmented reality content.

Figure 4:
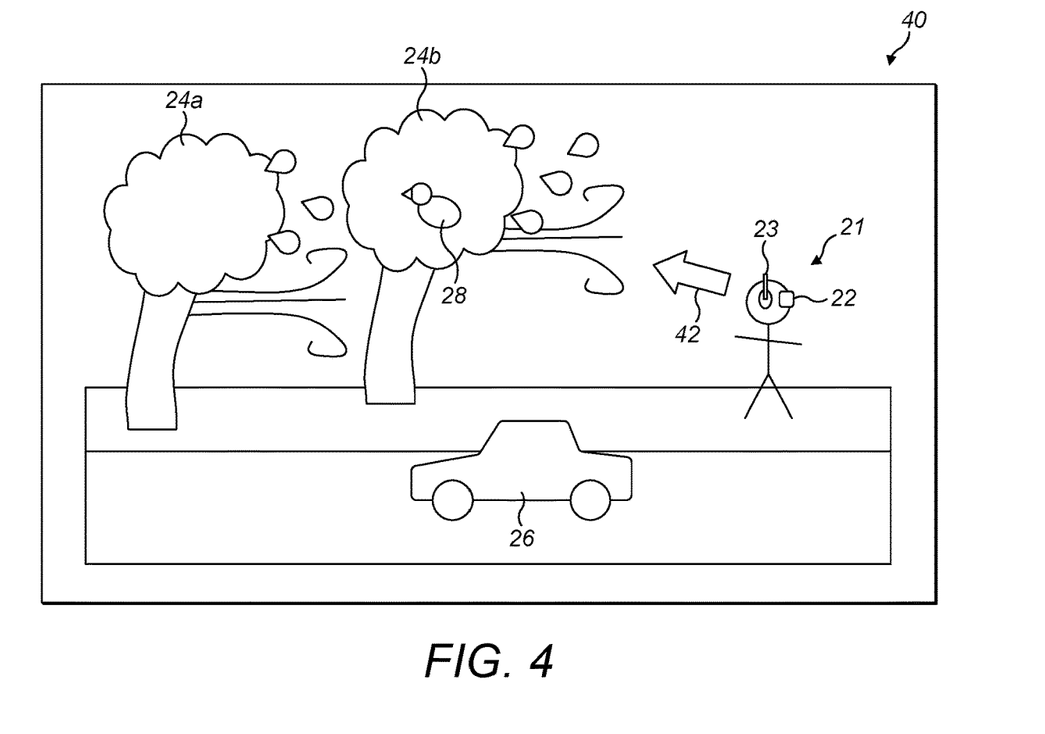

FIG. 4 is a block diagram showing an example scenario, indicated generally by the reference numeral 40, in which example embodiments may be used. The scenario 40 includes the user 21, who is wearing the AR glasses 22 and the headphones 23. The user 21 is walking along a street, which includes the first tree 24a, the second tree 24b and the car 26. The virtual bird 28 (as presented to the user 21 using the AR glasses 22) has landed on the second tree 24b.

Figure 5:
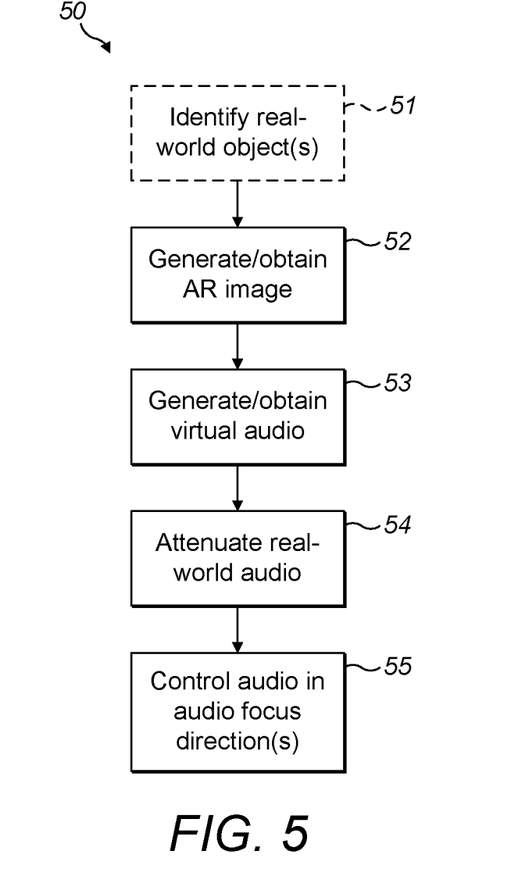
FIG. 5 is a flowchart showing an algorithm in accordance with an example embodiment.

FIG. 5 is a flowchart showing an algorithm, indicated generally by the reference numeral 50, in accordance with an example embodiment. The algorithm 50 is described below with reference to the scenario 40.

The algorithm 50 stars at operation 51, where real-world objects (such as the trees 24a, 24b and the car 26) are identified. As discussed in detail below, the real-world objects may be identified using one or more cameras (e.g. one or more cameras associated with a headset being worn by the user 21, as discussed further below). In some embodiments, the operation 51 may be omitted.

At operation 52, augmented reality images for presentation to the user 21 using the AR glasses 22 are generated or obtained (for example by the AR output generation module 12). The augmented reality images comprise at least one virtual object, display or device (such as the virtual bird 28). Thus, the augmented reality images may comprise, for example, multiple virtual objects, a virtual object and a virtual display, a virtual device or any other combination.

At operation 53, virtual audio of the augmented reality system for presentation to the user using the headphones 23 is generated or obtained (for example by the AR output generation module 12). The virtual audio may be associated with one or more of said virtual objects, displays or devices. Thus, for example, virtual audio associated with the virtual bird 28 may be provided to the user 21. In some embodiments, the operation 53 may be omitted (e.g. if there is no virtual audio to be presented to the user).

At operation 54, real-world audio of the augmented reality system is attenuated, for example using active noise control. Thus, real-world audio such as a noisy road scene may be attenuated.

At operation 55, the provision of audio to the user is controlled in one or more beamform directions relating to one or more selected real-world objects of the augmented reality system. In the scenario 40, an example audio-focus direction is indicated by the arrow 42.

By way of example, in the scenario 40, the operation 55 may be implemented such that, when the virtual bird 28 lands on the second tree 24b, audio focussing is performed in the direction 42 (i.e. towards the virtual bird 28). The audio focussing may amplify sounds in the audio focus direction relative to other directions. One example of audio focussing is audio beamforming that causes the real-world sound of the wind in the tree to be heard along with the (virtual) sounds of the virtual bird 28. The other real-world sounds around the user (i.e. not in the audio focus direction 42) remain attenuated.

It should be noted that the audio focus direction 42 does not need to be the same as the direction in which the user 21 is orientated. For example, in the example scenario 40, the user 21 is not looking at the virtual bird 28 that has landed in the second tree 24b.

Figure 6:
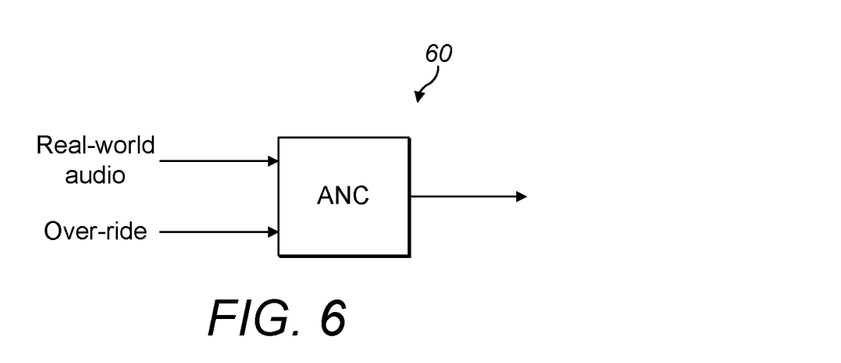
FIG. 6 is a block diagram of an active noise control module in accordance with an example embodiment.

FIG. 6 is a block diagram of an active noise control (ANC) module, indicated generally by the reference numeral 60, in accordance with an example embodiment. The ANC module 60 may be used to implement the operations 54 and 55 described above. (In some embodiments, the operations 54 and 55 may be implemented in a single operation.)

The ANC module 60 receives real-world audio (for example obtained using one or more microphones, as discussed further below) at a first input and receives an over-ride signal at a second input.

The real-world audio received at the first input of the ANC module 60 is attenuated, thereby implementing the operation 54. However, the over-ride signal is used to controlling overriding of the attenuation of the real-world audio in the one or more audio focus directions (as discussed further below), thereby implementing the operation 55. This seeks to improve an immersion effect.

It should be noted that the provision of an "override" signal is not essential to all example embodiments; many alternative arrangements exist. For example, focussed (e.g. beamformed) real-world audio may be mixed with AR audio, without "overriding" the attenuation itself, in order to provide a similar effect to the overriding described above.

Figure 7:
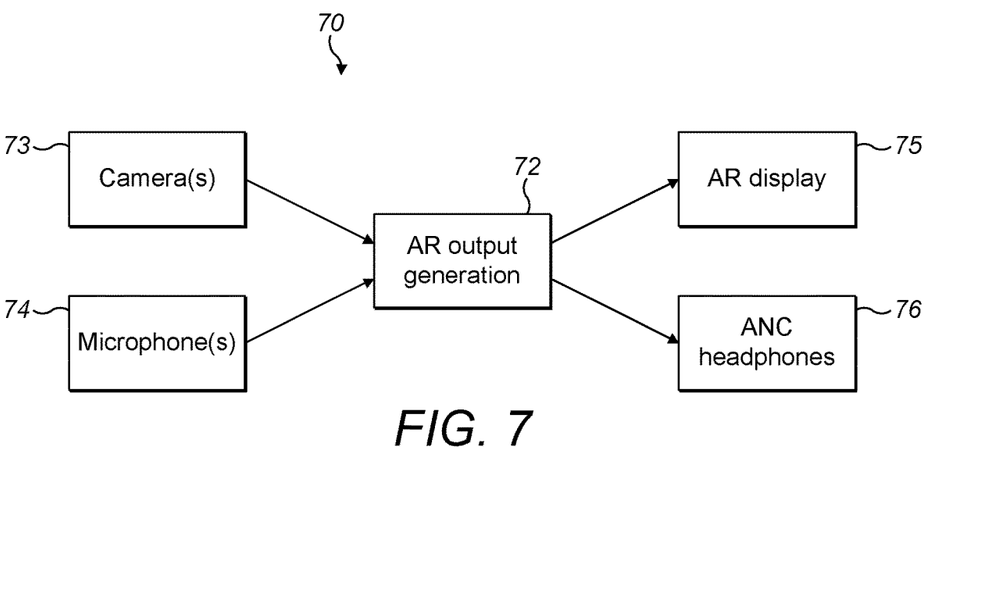
FIG. 7 is a block diagram of a system in accordance with an example embodiment.

FIG. 7 is a block diagram of a system, indicated generally by the reference numeral 70, in accordance with an example embodiment. The system 70 comprises an augmented reality (AR) output generation module 72 (similar to the AR output generation module 12 described above), an augmented reality display 75 (similar to the augmented reality display 14 described above) and active noise control (ANC) headphones 76 (similar to the headphones 16 described above). The system 70 further comprises one or more cameras 73 and one or more microphones 74.

The one or more microphones 74 may be used to provide the real-world audio to the ANC module 60 as described above.

The one or more cameras 73 may form an imaging system that can be used to determine dimensions of one or more of the selected real-world objects. The overriding of the attenuation of said real-world audio (e.g. as implemented by the ANC module 60) may be implemented depending on the determined dimensions.

Figure 8:
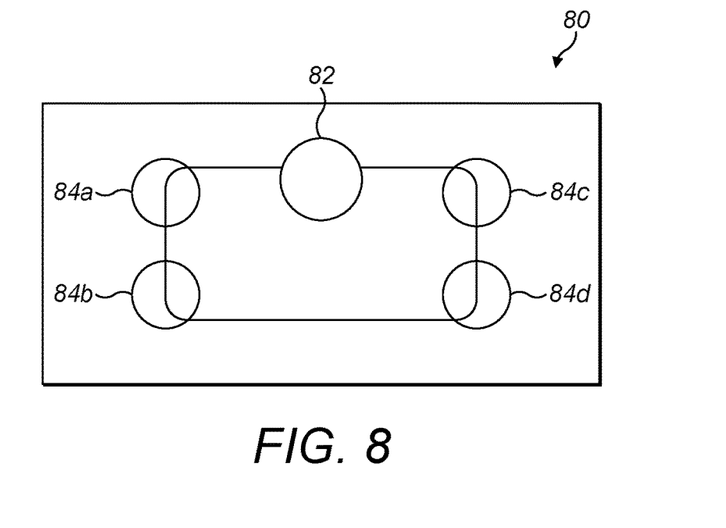
FIG. 8 is a block diagram of a device used in accordance with an example embodiment.

FIG. 8 is a block diagram of a device, indicated generally by the reference numeral 80, used in accordance with an example embodiment. The device 80 comprises a camera 82 and first to fourth microphones 84a, 84b, 84c and 84d and may form part of a headset of the user 21. The camera 82 is an example of the one or more cameras 73 of the system 70. Similarly, the microphones 84a to 84d are examples of the one or more microphones 74 of the system 70. The use of multiple microphones enables audio focussing, such as beamforming (by being able to distinguish between audio inputs from different direction). The camera 82 may be used for real-world object detection. Of course, the use of four microphones is not essential; other numbers of microphones could be provided. Similarly, multiple cameras may be used (instead of just one).

The scenario described above in which a virtual object (such as the virtual bird 28) moves around a scene and may interact with one or more real-world objects (e.g. as detected by one or more cameras) is one of many potential uses of the principles described herein.

Figure 9:
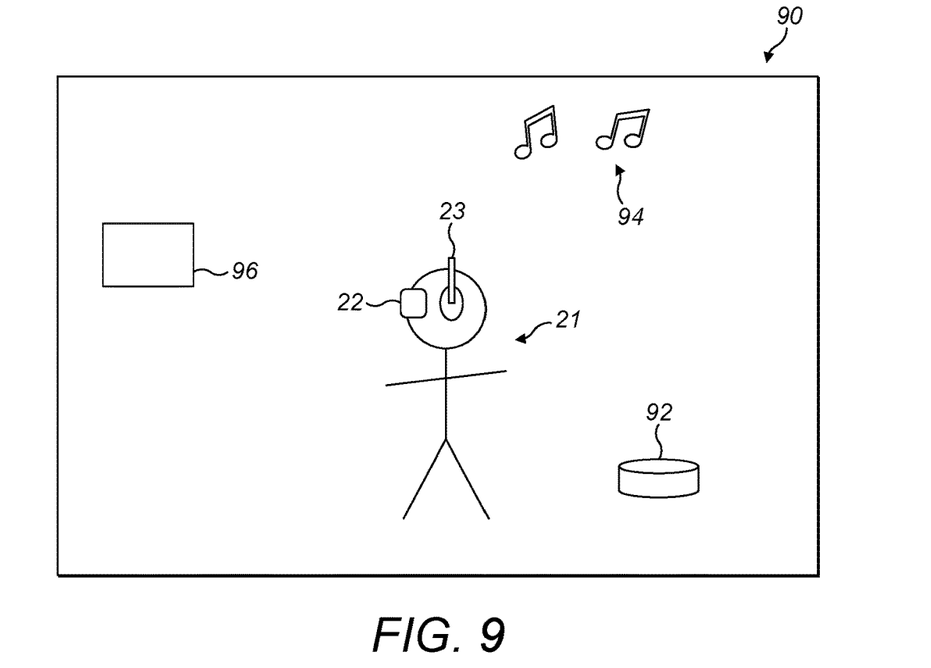
FIGS. 9 to 11 are block diagrams showing example scenarios in which example embodiments may be used.

FIG. 9 is a block diagram of example scenario, indicated generally by the reference numeral 90, in which example embodiments may be used. In the scenario 90, the user 21 is wearing the augmented reality (AR) glasses 22 and the ANC equipped headphones 23 described above. The user 21 is within a room, such as a living room.

A number of noise sources are present in the scenario 90, including a robot vacuum cleaner 92, a music source 94 (e.g. a radio) and a television 96. As described above, the user 21 can use the active noise control functionality of the headphones 23 to attenuate the noise from those noise sources.

Figure 10:
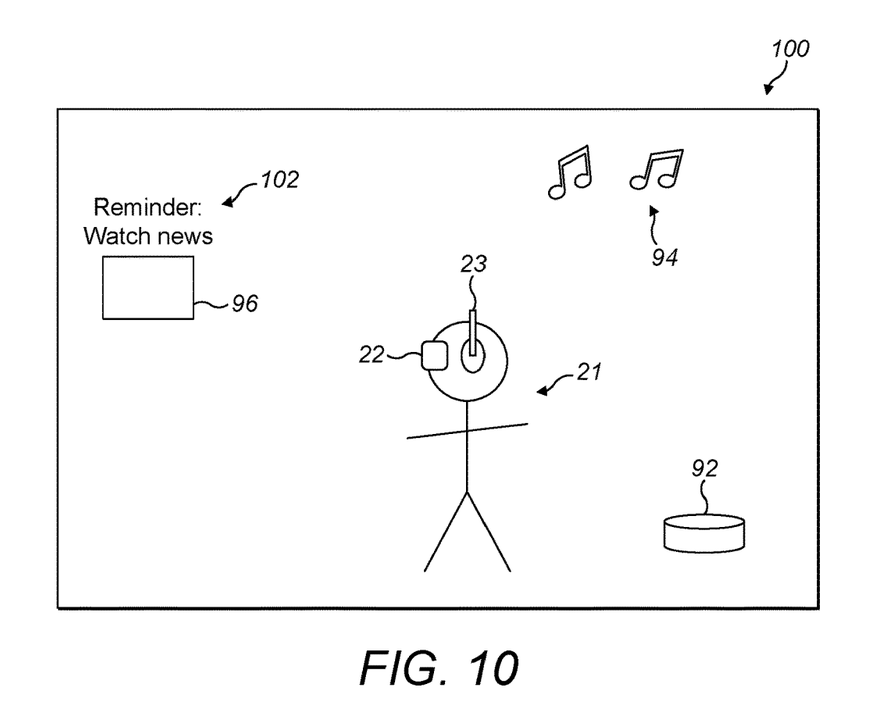

FIG. 10 is a block diagram of example scenario, indicated generally by the reference numeral 100, in which example embodiments may be used. In the scenario 100, the user 21 is still using the headphones 23 to attenuate noise from the robot vacuum cleaner 92, the music source 94 and the television 96.

In the scenario 100, a (virtual) reminder 102 is presented to the user 21 using the AR glasses 22 (e.g. as an augmented reality image). The reminder 102 states: "Reminder: watch news". By activating the reminder, the television 96 is turned on. However, the sound of the television set remains attenuated by the headphones 23.

Figure 11:
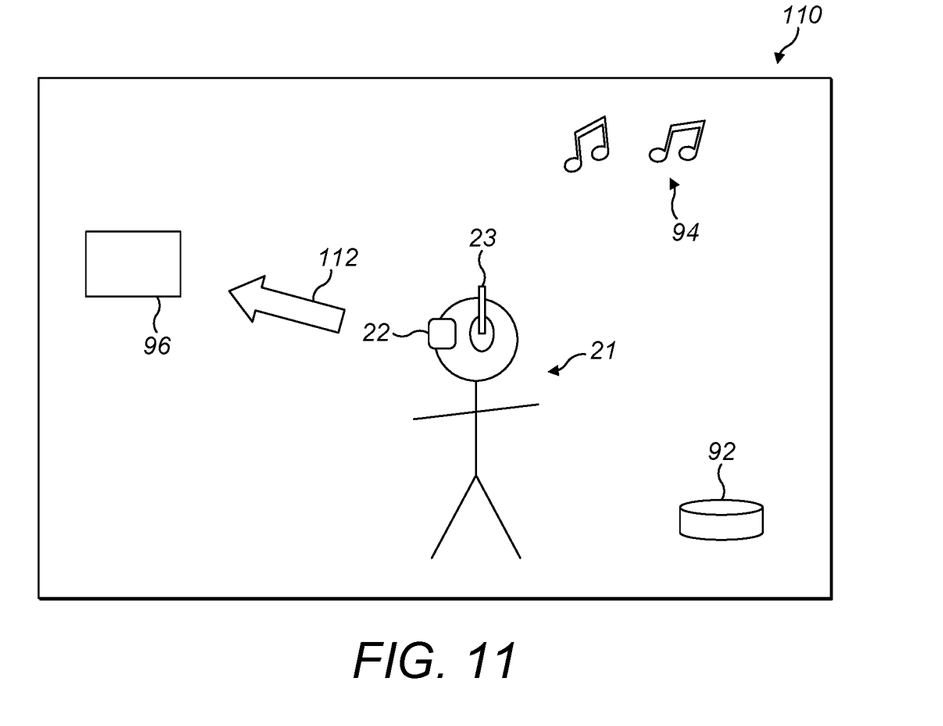

FIG. 11 is a block diagram of example scenario, indicated generally by the reference numeral 110, in which example embodiments may be used. In the scenario 110, the user 21 has activated the reminder 102. In response, audio focussing (e.g. audio beamforming) 112 is performed in the direction of the television 96. The audio focussing/beamforming 112 may control an overriding of the attenuation of the real-world audio in the direction 112 (e.g. using ANC module 60) such that sound from the television set can be heard by the user 21.

The algorithm 50 described above may be used in the scenario 110.

The algorithm 50 starts at operation 51, where real-world objects (e.g. one or more of the robot vacuum cleaner 92, the music source 94 and the television 96) are identified. As discussed above, the real-world objects may be identified using one or more cameras (such as the camera 73). In some embodiments, the operation 51 may be omitted.

At operation 52, augmented reality images for presentation to a user 21 using the AR glasses 22 are generated or obtained (for example by the AR output generation module 12). One example augmented reality image is the reminder 102. Similarly, at operation 53, virtual audio of the augmented reality system for presentation to the user using the headphones 23 is generated or obtained (from example by the AR output generation module 12). The augmented reality images and the virtual audio may be related to one or more objects within the scenario 110, or may be totally unrelated. (Note that, in some embodiments, there may be no virtual audio, such that the operation 53 may be omitted.)

At operation 54, real-world audio of the augmented reality system is attenuated, for example using active noise control. Thus, real-world audio such as a noise from the robot vacuum cleaner 92, the music source 94 and the television 96 may be attenuated.

At operation 55, the provision of audio to the user is controlled in the audio focus direction 112 (e.g. a beamform direction). In this way, the attenuation of the television sound may be overridden such that the user 21 can hear the television. (Note that the operations 54 and 55 may be implemented in a single operation.)

Figure 12:
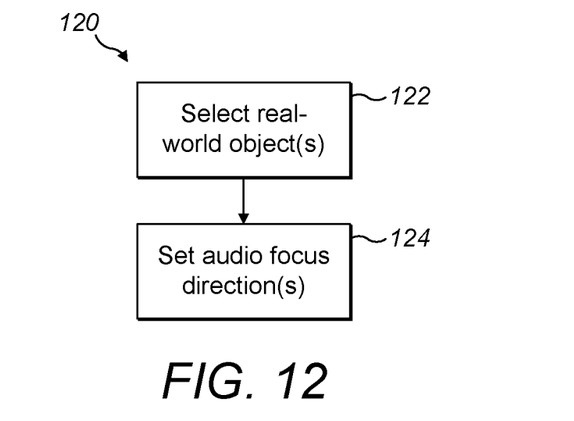
FIG. 12 is a flowchart showing an algorithm in accordance with an example embodiment.

FIG. 12 is a flowchart showing an algorithm, indicated generally by the reference numeral 120, in accordance with an example embodiment. The algorithm 120 is an example implementation of the operation 55 of the algorithm 50 described above.

The algorithm 120 starts at operation 122 where one or more real-world objects are selected. These may, for example, be the real-world objects for which attenuation is to be overridden.

The operation 122 may be implemented in a number of different ways. For example, the operation 122 may include identifying one or more first real-world objects with which one or more of said virtual objects, displays or devices (such as the virtual bird 28 or the reminder 102) interact, wherein said one or more selected real-world objects include said first real-world object. Alternatively, or in addition, the operation 122 may include identifying one or more second real-world objects that are contextually relevant to one or more of said virtual objects, displays or devices, wherein said one or more selected real-world objects include said second real-world objects. Alternatively, or in addition, the operation 122 may include identifying one or more third real-world objects, wherein said third real-world objects are associated with one or more of the identified virtual objects with which the user interacts.

At operation 124 of the algorithm 120, audio focussing (e.g. beamforming) is set dependent on the one or more real-world objects selected in operation 122. Thus, one or more audio focus/beamforming directions are set. As discussed further below, the width of a beamforming signal may be variable, for example based on a number of factors, including the width of a selected real-world object (from the user's perspective). For example, the beam width may be set such that the whole real-world object is captured and no more. The dimensions of the real-world object may be obtained from a camera-based object detection/recognition module housed in the AR device (such as the camera 73 described above). The audio focus/beamforming parameters may also be adjusted depending on the size of the AR object interaction with the real-world object. As an example, if the virtual bird 28 described above lands on a small branch and the small branch is made to move in augmented reality, the audio focus/beamforming parameters may case a narrow beam to be used whereas if the virtual bird lands on a large branch, a wider beam may be used. Furthermore, in the television reminder case, the user may "click" the reminder while performing an arc gesture with his hand. The length of the arc may define the beam width. The user may wish to include his friend in the beam so that they may discuss about the TV program. In further embodiments, the size of the interaction itself has an effect on the beam parameters for ANC pass through. For example, swipe gestures of different sizes cause the creation of different sized beams.

The ANC pass through may be done using several methods. In some methods the active noise control is modified so that sounds from a direction are passed through more than sounds from other directions. A simple way to do this is to stop doing active noise control processing in one ear which passes sounds through more from that ear direction than from other directions (this skilled person will be aware of many other example implementations). In some other methods audio focussing or audio beamforming is performed regardless of the active noise control and the focussed/beamformed signal is played to the user in addition to other audio signals.

Figure 13:
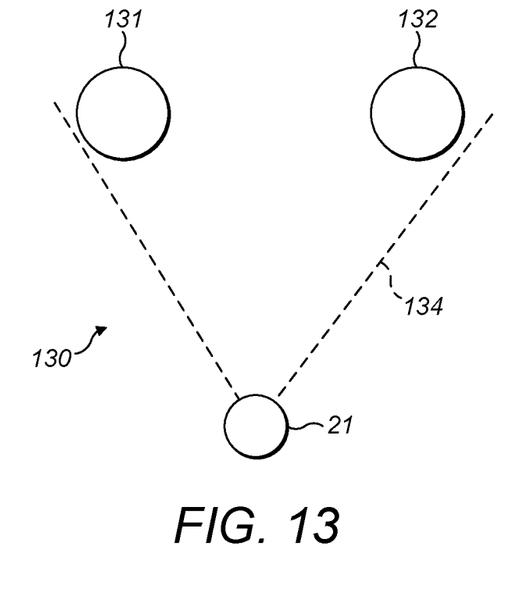
FIGS. 13 and 14 are block diagrams of systems in accordance with example embodiments.

FIG. 13 is a block diagram of a system, indicated generally by the reference numeral 130, in accordance with an example embodiment. The system 130 shows the user 21 described above and a group of real-world objections including a first real-world object 131 and a second real-world object 132. The system 130 also shows a beamform 134 for the group of real-world objects having a width such the attenuation of real-world audio (as discussed in detail above) can be overridden for a group of selected real-world objects.

Figure 14:
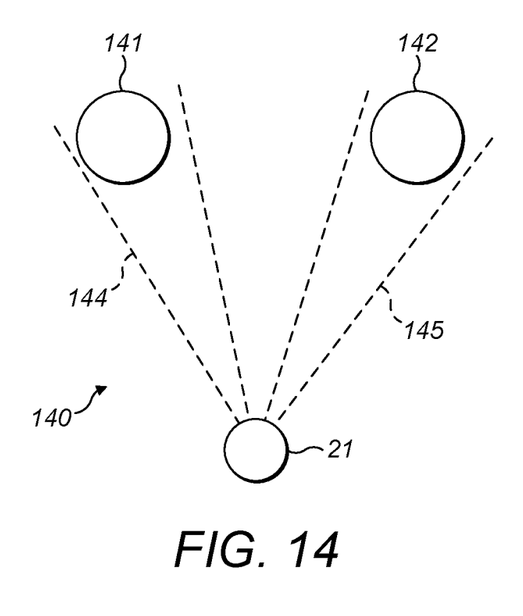

FIG. 14 is a block diagram of a system, indicated generally by the reference numeral 140, in accordance with an example embodiment. The system 140 shows the user 21 described above and a group of real-world objections including a first real-world object 141 and a second real-world object 142. The system 140 also shows a first beamform 144 in the direction of the first real-world object 141 and a second beamform 145 in the direction of the second real-world object 142. The directions and dimensions of the beamforms 144 and 145 are such that the attenuation of real-world audio (as discussed in detail above) can be overridden for a group of selected real-world objects.

The dimensions of beamforms such as the beamforms 134, 144 and 145 described above may be set automatically, for example based on dimensions of real-world objects (e.g. as detected by a camera). However, this is not essential to all embodiments. For example, a user input may be received to indicate dimensions of one or more of the selected real-world objects. Thus, the controlling of overriding of the attenuation of said real-world audio may be dependent on user-indicated beamform dimensions.

As discussed in detail above, audio signals in a beamform direction may be generated by overriding attenuation of real-world audio in the beamform direction. However, this is not essential to all embodiments.

Figure 15:
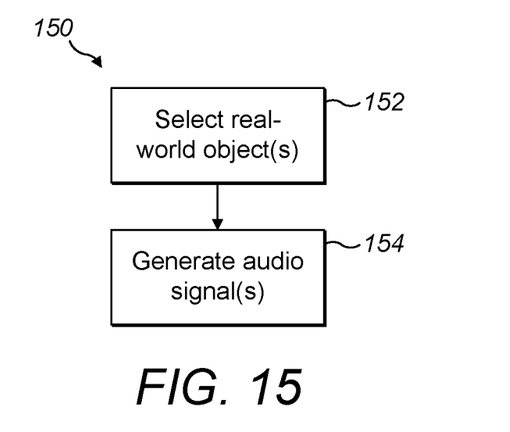
FIG. 15 is a flowchart showing an algorithm in accordance with an example embodiment.

FIG. 15 is a flowchart showing an algorithm, indicated generally by the reference numeral 150, in accordance with an example embodiment. The algorithm 150 is an example implementation of the operation 55 of the algorithm 50 described above.

The algorithm 150 starts at operation 152 where one or more real-world objects are selected. These may, for example, be the real-world objects for which attenuation is to be overridden.

The operation 152 may be implemented in a number of different ways. For example, the operation 152 may include identifying one or more first real-world objects with which one or more of said virtual objects, displays or devices (such as the virtual bird 28 or the reminder 102) interact, wherein said one or more selected real-world objects include said first real-world object. Alternatively, or in addition, the operation 152 may include identifying one or more second real-world objects that are contextually relevant to one or more of said virtual objects, displays or devices, wherein said one or more selected real-world objects include said second real-world objects. Alternatively, or in addition, the operation 152 may include identifying one or more third real-world objects, wherein said third real-world objects are associated with one or more of the identified virtual objects with which the user interacts.

At operation 154 of the algorithm 150, an audio signal(s) is/are generated based on the selected real-world objects. For example, one or more audio focus or beamforming directions may be set based on the selected real-world objects (as discussed in detail above) and audio may be provided in the one or more audio focus/beamform directions. In some embodiments, the audio focus/beamforming directions may be set based on the augmented visual object direction because the real world object is naturally approximately in the same direction.

The audio provided in the operation 154 may be generated in many different ways. For example, audio data may be obtained from another source. For example, in the scenario 110 described above, audio for the television 96 may be provided from a television audio feed signal. In another example embodiment, audio data may be obtained by synthesising audio.

In an example embodiment, the operation 154 may perform a preliminary analysis in order to decide how to convey the real-world object's audio to the user. This analysis may include one or more of:

- Estimating the quality of the audio focussing or beamforming (e.g. to understand whether other noise sources affect the desired audio). For example, if there are other users present in the same physical space but pointing at different directions/objects, if the audio coming from the beamforming and from the other users is correlated/similar, this can be an indication of poor quality of audio beamforming.
- Determining whether it is possible to obtain realistic audio about the real world object in a synthesized form, understanding whether it is possible to obtain the actual audio from the real-world object from another source than the physical object itself.
- Consider whether suitable real-world audio can be obtained from a source other than the physical object itself. To this end, the system may first determine whether the object is a connected device, such as an Internet-of-Things (IoT) device (as with the television 96 described above). If the object is a connected device, the system may connect to the same network as the device and request the same audio which is output by the device in the physical space. In the example of the television 96, the user may get the audio for the television program which is shown on the physical television but from its headphones, and the audio will not come from the physical television but from either the same source used by the television (e.g., the same server) or from a different but equivalent source (e.g., another server).

In another example embodiment, the system may decide to use synthesized audio or audio from a different source even if the quality of the audio focussing or beamforming is high. This may happen when the user-worn device has limited resources (such as power, computational complexity, etc.) and the audio focussing/beamforming process would consume too much of its resources, and is instead more convenient to get synthesized audio samples or to get the original audio from the same source used by the physical device (see our embodiments above).

Figure 16:
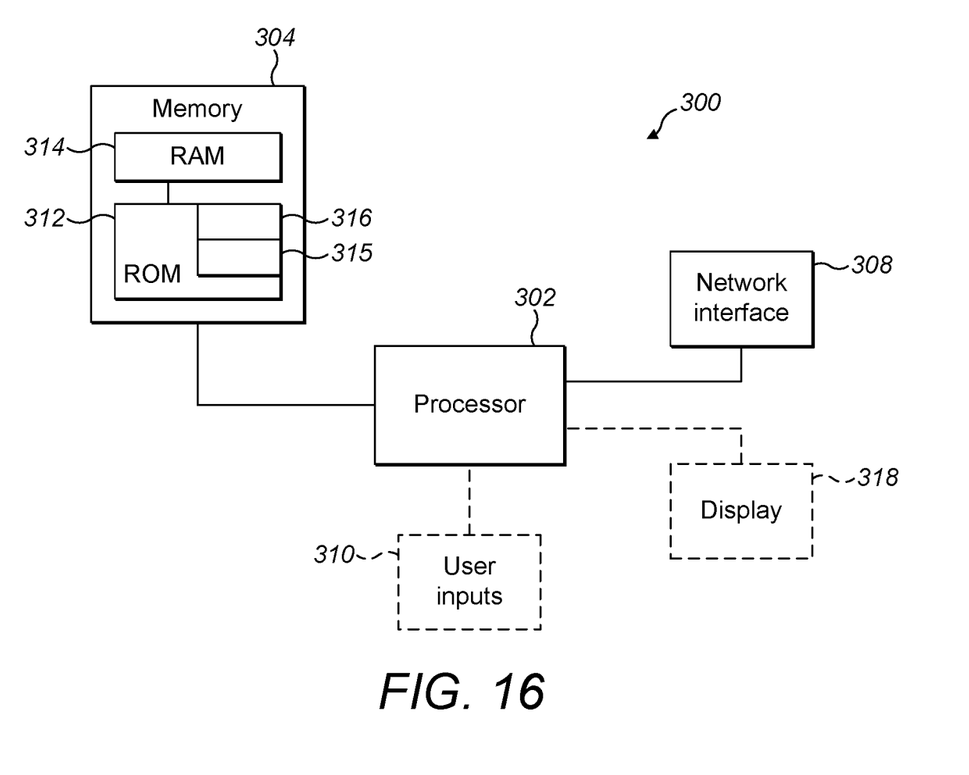
FIG. 16 is a block diagram of components of a system in accordance with an example embodiment.

For completeness, FIG. 16 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 50, 120 and 150 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 17A:
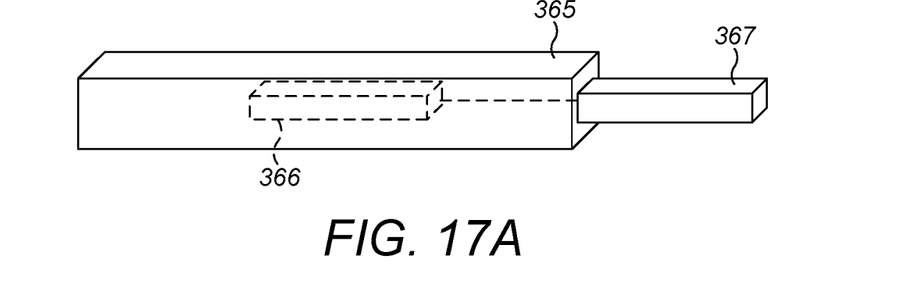
FIGS. 17A and 17B show tangible media, respectively a removable non-volatile memory unit and a Compact Disc (CD) storing computer-readable code which when run by a computer perform operations according to example embodiments.
Figure 17B:
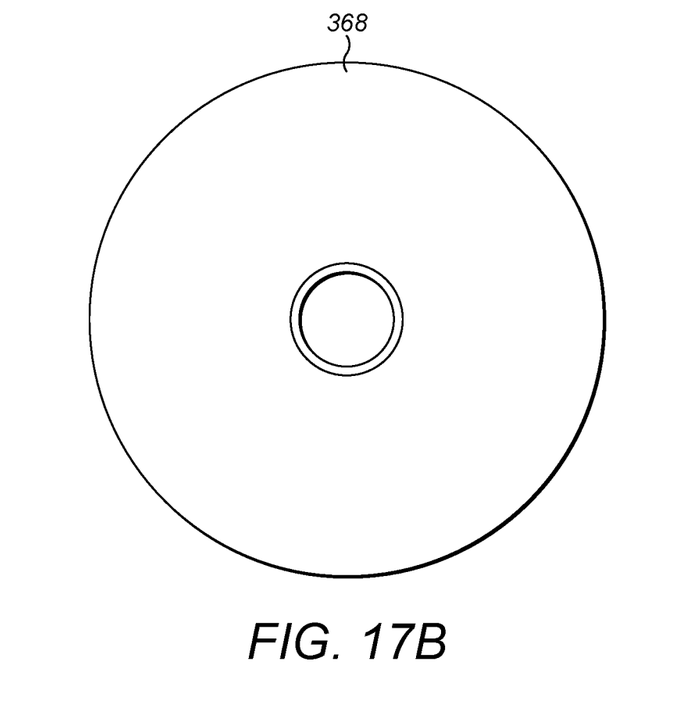

FIGS. 17A and 17B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 5, 12 and 15 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
    at least one processor; and
    at least one memory including computer program code, the at least one memory and the computer program code configured to, with the at least one processor, cause the apparatus to perform at least the following:
    generate or obtain at least one augmented reality image for presentation, the at least one augmented reality image associated with at least one virtual object, display or device of an augmented reality system;
    attenuate real-world audio of the augmented reality system;
    identify a real-world object in the at least one augmented reality image of the augmented reality system based on a user focus indicated by camera data, wherein the real-world object is identified independently of a direction in which a user is oriented;
    determine at least one virtual object interacting with the real-world object;
    determine dimensions of the real-world object; and
    control the provision of audio in at least one audio focus direction of the at least one virtual object interacting with the real-world object of the augmented reality system, such that the audio focus direction is independent of the direction in which the user is oriented, and in an area defined by the determined dimensions of the at least one real-world object determined based on the user focus indicated by camera data.

2. The apparatus as claimed in claim 1, wherein the apparatus is further configured to perform:
    generate or obtain virtual audio and cause provision of the virtual audio, wherein said virtual audio is associated with at least one of said at least one virtual object, display or device.

3. The apparatus as claimed in claim 1, wherein the apparatus is further configured to perform:
    provide real-world audio based on real-world audio in the at least one audio focus direction.

4. The apparatus as claimed in claim 3, wherein providing real-world audio based on the real-world audio in the at least one audio focus direction comprises:
    controlling overriding of the attenuation of said real-world audio in the at least one audio focus direction.

5. The apparatus as claimed in claim 3, wherein the apparatus is further configured to perform:
    use an imaging system to determine the dimensions of at least one of the at least one real-world object; and
    control the providing of the real-world audio depending on the determined dimensions.

6. The apparatus as claimed in claim 1, wherein the controlling the provision of audio in the at least one audio focus direction is configured to override the attenuation of said real-world audio.

7. The apparatus as claimed in claim 1, wherein the controlling the provision of audio in the at least one audio focus direction is configured to obtain synthesized audio.

8. A method comprising:
    generating or obtaining at least one augmented reality image for presentation, the at least one augmented reality image associated with at least one virtual object, display or device of an augmented reality system;
    attenuating real-world audio of the augmented reality system;
    identifying a real-world object in the at least one augmented reality image of the augmented reality system based on a user focus indicated by camera data, wherein the real-world object is identified independently of a direction in which the user is orientated;
    determining at least one virtual object interacting with the real-world object;
    determining dimensions of the real-world object; and
    controlling the provision of audio in at least one audio focus direction of the at least one virtual object interacting with the real-world object of the augmented reality system, such that the audio focus direction is independent of the direction in which the user is orientated, and in an area defined by the determined dimensions of the at least one real-world object determined based on the user focus indicated by camera data.

9. The method as claimed in claim 8, further comprising:
    generating or obtaining virtual audio and causing provision of the virtual audio, wherein said virtual audio is associated with at least one of said at least one virtual object, display or device.

10. The method as claimed in claim 8, further comprising:
    providing real-world audio based on real-world audio in the at least one audio focus direction.

11. The method as claimed in claim 10, wherein providing real-world audio based on the real-world audio in the at least one audio focus direction comprises:
    controlling overriding of the attenuation of said real-world audio in the at least one audio focus direction.

12. The method as claimed in claim 10, further comprising:
    using an imaging system to determine dimensions of at least one of the at least one real-world object; and controlling the providing of the real-world audio depending on the determined dimensions.

13. A non-transitory computer readable medium comprising program instructions stored thereon for performing at least the following:

generating or obtaining at least one augmented reality image for presentation, the at least one augmented reality image associated with at least one virtual object, display or device of an augmented reality system;

attenuating real-world audio of the augmented reality system;

identifying a real-world object in the at least one augmented reality image of the augmented reality system based on a user focus indicated by camera data, wherein the real-world object is identified independently of a direction in which a user is orientated;

determining at least one virtual object interacting with the real-world object;

determining dimensions of the real-world object in the at least one augmented reality image of the augmented reality system based on camera data; and controlling the provision of audio in at least one audio focus direction of the at least one virtual object interacting with the real-world object of the augmented reality system, such that the audio focus direction is independent of the direction in which the user is orientated, and in an area defined by the determined dimensions of the at least one real-world object determined based on the user focus indicated by camera data.

* * * * *